J. SKINDERVIKEN.
ELECTRIC SAFETY SYSTEM FOR RAILROADS.
APPLICATION FILED MAR. 3, 1915.

1,159,723.

Patented Nov. 9, 1915.
2 SHEETS—SHEET 1.

Witnesses:
Leonard E. Bogue
A. A. Olson

Inventor
Johan Skinderviken
By Joshua R. H. Potts
His attorney.

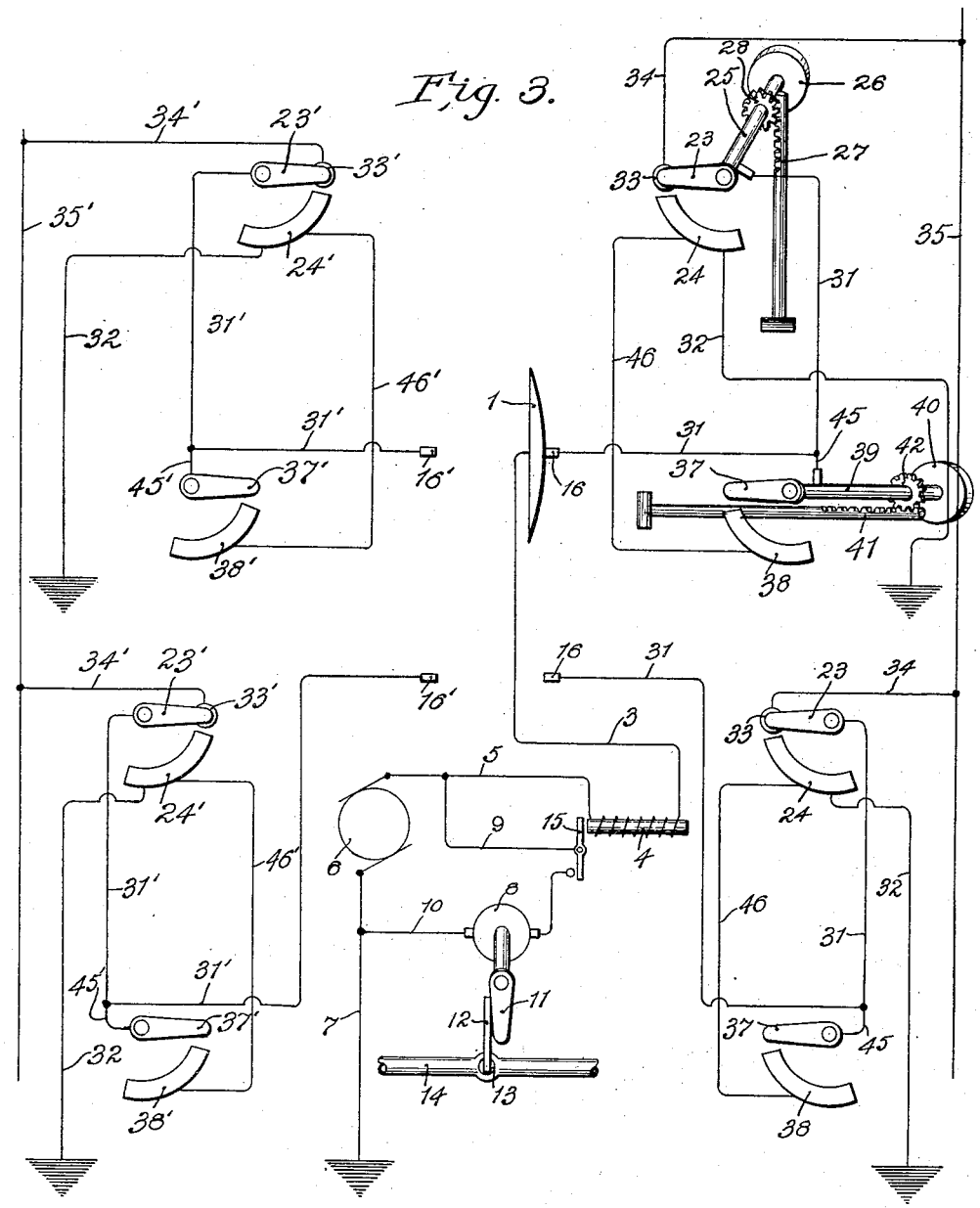

UNITED STATES PATENT OFFICE.

JOHAN SKINDERVIKEN, OF CHICAGO, ILLINOIS, ASSIGNOR OF ONE-HALF TO JASPER GIBBS, OF CHICAGO, ILLINOIS.

ELECTRIC SAFETY SYSTEM FOR RAILROADS.

1,159,723.  Specification of Letters Patent.  Patented Nov. 9, 1915.

Application filed March 3, 1915. Serial No. 11,768.

*To all whom it may concern:*

Be it known that I, JOHAN SKINDERVIKEN, a subject of the King of Norway, and a resident of the city of Chicago, county of Cook, and State of Illinois, have invented certain new and useful Improvements in Electric Safety Systems for Railroads, of which the following is a specification.

My invention relates to improvements in electric safety systems for railroads designed to prevent head-on as well as tail-end collisions, and has for its object the production of a system of this character which will be of simple arrangement and construction and reliable and efficient in use.

Other objects will appear hereinafter.

The invention consists in the combinations and arrangements of parts hereinafter described and claimed.

Figure 2:
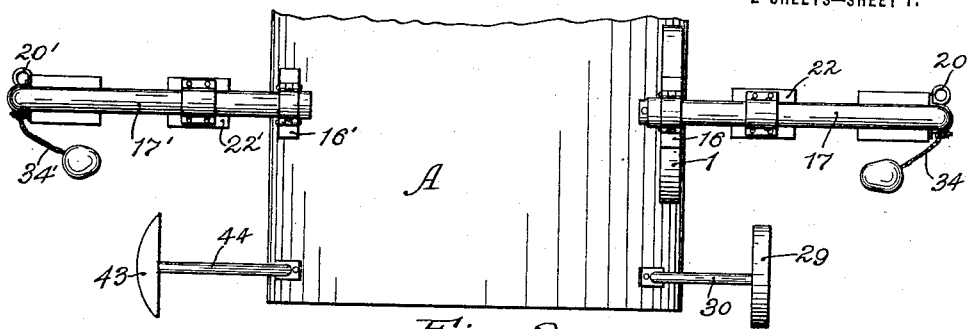
Figure 1:
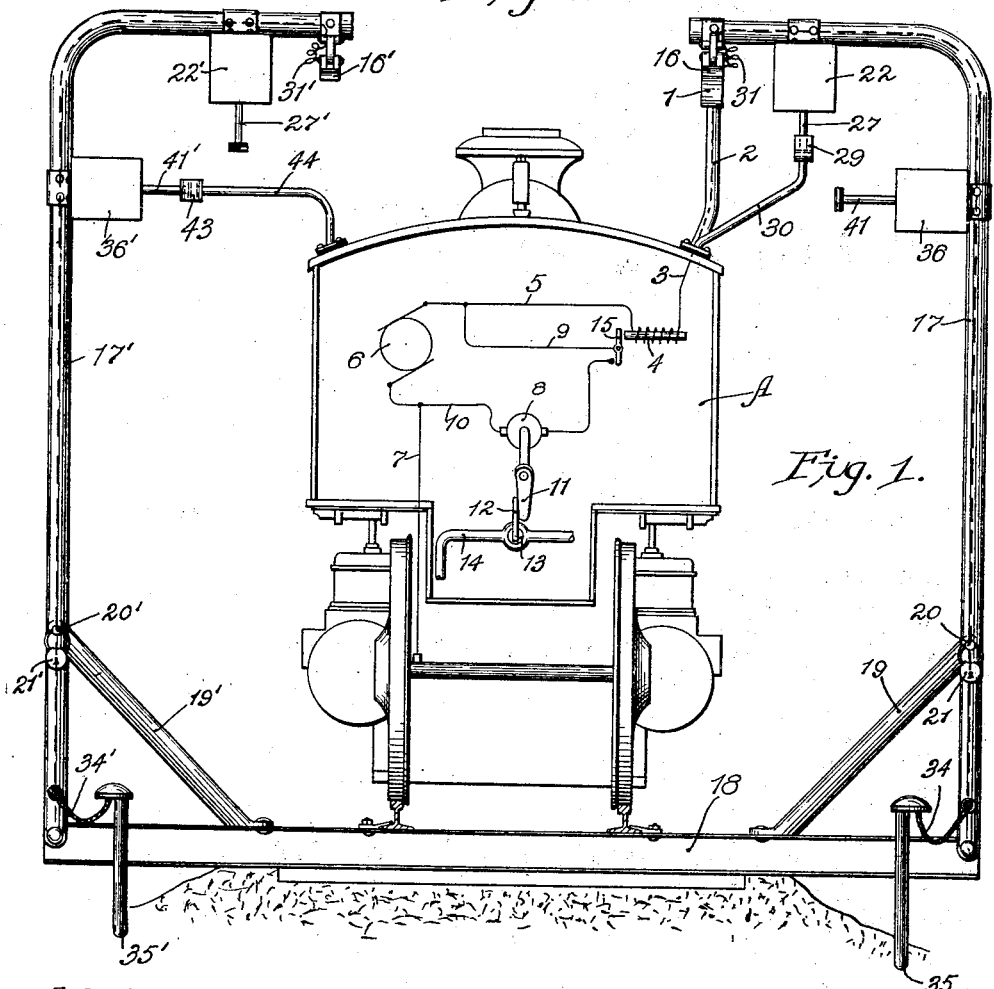

The invention will be best understood by reference to the accompanying drawings forming a part of this specification, and in which, Figure 1 is a vertical transverse section through a single track railroad equipped with a safety system embodying the invention, Fig. 2 is a top plan view of the construction shown in Fig. 1, and Fig. 3 is a diagrammatic representation of the system.

As illustrated in the drawings, the system is applied to a single track railroad or one where trains are required to move in both directions, making it necessary to provide against both head-on and tail-end collisions. In this case, each train traveling over the track and preferably the locomotive which is shown at A is equipped with a contact member or brush 1 which is supported at the upper end of a post 2 arising from the roof of the cab of the locomotive at one side of the latter. The contact 1 is electrically connected by means of conductor 3 with a relay 4, which in turn is connected by means of a conductor 5 with one side of a dynamo or other suitable form of electrical generator 6. The opposite side of said dynamo is connected through a conductor 7 with any suitable portion of the locomotive which will serve to ground the circuit, as will be readily understood. Also provided upon each locomotive is an electric motor 8 connected by means of conductors 9 and 10 in series with the dynamo 6 so that upon energizing of said dynamo, said motor will be operated. The power shaft of said motor carries a trip arm 11 adapted, upon operation of the motor, to trip the operating lever 12 of an exhaust valve 13 provided in the compressed air pipe 14 of the brake system of the train in order to open said valve and thus effect setting of the brakes of the train, as will be readily understood by those skilled in the art. The circuit which includes the motor and dynamo is normally broken by a switch 15 interposed in conductor 9, said switch being so arranged that, upon energizing of relay 4, said switch will be moved to closed position in order to close the circuit including the motor and dynamo. With the construction set forth then, it will be seen that, the controlling circuit or that which passes through the relay 4 is grounded at one terminal and has the contact 1 for its other terminal, the arrangement being such therefore, that in order to close said circuit, it is only necessary to ground the terminal of contact 1. When this is accomplished it will be seen that the valve 13 will be automatically actuated to reduce the pressure in the pipe 14 and thus effect setting of the brakes of the train with the ultimate result of stopping the latter.

Arranged at intervals along the track is a plurality of contact members or brushes 16 which are carried by posts 17 pivoted at their lower ends to transversely extending supporting beams 18, as clearly shown in Fig. 1. The posts 17 are securely held in upright position by means of brace members 19, the upper ends of which are releasably connected with said posts by means of pins 20 which are releasably locked in position by suitable locking devices 21. The arrangement is such, as will be seen, that upon unlocking of the pins 20 and removal thereof, the posts 17 will be free to be swung downwardly so as to permit of ready access being gained to the upper ends thereof.

The contacts 16 are so positioned that in the travel of a train, the contact 1 of the latter will successively engage said members 16, as will be readily understood. Supported at the upper end of each post 17 adjacent the contact 16, is a make-and-break device 22 comprising a casing within which is arranged a relatively movable contact 23 and a relatively stationary contact 24 of segmental form adapted to be engaged by said contact 23. The contact 23 is carried by a rotatable shaft 25 which is operatively connected with suitable clockworks arranged in a casing 26. The contact 23 is moved into engagement with the contact 24 by means of a longitudinally movable plunger 27 having rack teeth at its inner end which engage with a pinion 28 provided upon the shaft 25. The arrangement is such that, upon rotation of the shaft 25 through actuation of the plunger 27, the contact 23 will be brought into engagement with the contact 24 and the clock-works will be wound or set, said contact 23 remaining in engagement with the contact 24 for a predetermined period of time, as may be regulated by adjustment of the clock-works which control the return movement of the shaft 25. The preferable adjustment in this connection, however, is such that upon actuation of the plunger 27 carrying the contact 23 into engagement with the contact 24, said contact 23 will remain in engagement with the contact 24 for three minutes.

The plunger 27 is actuated to effect setting of the contact 23, as just mentioned, by means of cam member 29 carried at the outer end of an arm 30 which is carried upon each locomotive engine. The arrangement is such, that in the travel of a train, the cam member 29 thereof will successively engage and actuate the plungers 27 passed thereby. The cam member 29 of each train, as will be seen in Fig. 2, is arranged rearwardly of the contact 1 so that in the travel of the train, the contact 1 thereof will have passed out of engagement with a contact 16 before the cam member 29 engages with the corresponding plunger 27.

Each of the contacts 16 is electrically connected by means of a conductor 31, as shown in Fig. 3, with the corresponding contact 23. Each contact 24 is suitably grounded, as illustrated, by conductor 32. With this arrangement then, it will be seen that, when the contact 23 is moved into engagement with the contact 24, an electrical connection between the contact 16 and the ground will be established so that when the contact 1 of a train engages with the contact 16, with the corresponding make-and-break device 22 in closed condition, (that is with the contact 23 in engagement with the contact 24) the desired grounding of the contact 1 will be effected, resulting in the closing the main circuit of the train through the relay 4 and consequently in the automatic setting of the brakes of the train, as above set forth. With this arrangement then, it will be seen that, in the travel of a train, each make-and-break device 22 of the posts 17 passed thereby, will be actuated to closed condition by the cam member 29 of the train. Said make-and-break devices will each remain in closed condition for three minutes or during the period controlled by the clock-works 26 thereof, so that a second train less than three minutes behind the first, or which passes any one of the make-and-break devices 22, which still remains in closed condition, will be automatically stopped in the manner above described. Also coöperating with each movable contact 23 is a second supplemental relatively stationary contact 33, with which said contact 23 normally engages. Each contact 33 is connected by means of conductor 34 with a common conductor 35 extending along the track but insulated therefrom and from the ground. The contacts 33 will be connected up in groups or sections, each conductor 35 being connected with say six or eight of said contacts. With this arrangement, in the event of a train becoming stalled for any reason for a period more than three minutes, or the time which the make-and-break devices, after actuation, are adapted to remain closed, the conductor of the train or anyone in control by simply cutting in on the conductor 35, as by means of a branch wire which may be carried upon the train, may very readily and easily temporarily ground the same and thus effect grounding of all of the contacts 16 under the domination of said conductor 35.

It is, of course, clear that upon grounding of the conductor 35 at any point, the current from any one of the contacts 16 under the domination of said conductor will pass through the corresponding conductor 31 to the corresponding contact 23, thence through the corresponding contact 33 and thence through the corresponding branch conductor 34 to the common conductor 35. With this arrangement then, it will be seen that, in case of the emergency mentioned, upon grounding of the corresponding conductor 35, a second train passing the first one of the contacts 16 under the domination of said conductor 35, would be instantly stopped and thus collision avoided. Also mounted upon each post 17 is a make-and-break device 36 of a construction substantially the same as the make-and-break devices 22, said device 36 comprising a relatively movable contact 37 arranged for coöperation with a relatively stationary contact 38 which are arranged within the housing of said device. The contact 37 is carried by a rotatable shaft 39 operable by suitable clock-works mounted in a casing 40, the arrangement being such that, when the contact 37 is moved into engagement with the contact 38, the same will remain in engagement with said contact 38 for a pre-determined period, such as three minutes as controlled by said clock-works or in the same manner as above described with regard to the devices 22. The contact 37 is set or moved into engagement with the contact 38 by means of a plunger 41 having rack teeth provided at the inner end thereof which mesh with a pinion 42 provided upon the shaft 39.

Provided upon each locomotive engine at the opposite side to that carrying the posts 2 and 30 is a cam member 43 carried at the outer end of a post 44 secured to the locomotive cab, as shown. With this arrangement, it will be seen that the plungers 41 of the posts 17 will be successively actuated by a train traveling in a direction opposite to that in which the locomotive engine A is moving.

The contact 37 of each of the devices 36 is electrically connected with the conductor 31 of the corresponding contact 16 by means of conductor 45, as clearly shown in Fig. 3. Also, each of the contacts 38 is connected by means of a conductor wire 46 with the contact 24 of the corresponding device 22. With this arrangement, in the event of a train moving toward the locomotive engine A, upon the same track, upon said train and locomotive coming under the domination of the same conductor 35, the contact 16 engaged by the contact 1 of the locomotive will be instantly grounded and thus effect stopping of the locomotive. The course of the current in this case may be readily traced by reference to Fig. 3 wherein is illustrated diagrammatically the construction and electrical connection between two adjacent posts. By reference to said figure, the course of the current in the case mentioned, will be from the contact 16 at the lower right hand side of said figure, or the lower post, through the corresponding conductor 31 to the corresponding contact 23, thence through the contact 33, conductor 34, conductor 35, thence along said conductor 35 to the conductor 34 corresponding with the post opposite the on-coming train. Thence through the corresponding contact 33 to the contact 23, thence through the conductors 31 and 45, to the corresponding contact 37. The contact 37 having been moved to closing position by the cam member 43 of the on-coming train, the current will pass through the contact 37 to the contact 38, thence through the conductor 46 to the contact 24 and thence through the conductor 32 to the ground. Posts 17' are also arranged along the opposite side of the track in precisely the same manner and provided with precisely the same equipment as the posts 17 so that the results above described in the case of a train traveling in one direction, will be precisely the same with a train traveling in the opposite direction, as regards the latter train. The mechanism of the posts 17' is numbered the same as the mechanism of posts 17, except that prime marks are attached to the reference characters of the former. Hence, with the construction set forth, in a single track railroad equipped with the mechanism set forth, the possibility of either a head-on or tail-end collision of trains traveling in either direction is absolutely precluded.

Where the system is to be used in connection with a double track railroad, or one in which the trains traveling upon one track all move in the same direction, the necessity of the provision of mechanism for preventing head-on collisions is, of course, avoided, and in this case the posts at one side of the track and the mechanism carried thereby may be dispensed with as well as the cam member 43 and the supporting arm 44 thereof carried by the train. Also, in this case, the make-and-break devices 36 of the posts still employed may also be dispensed with, since all of the mechanism for preventing tail-end collisions is included in the contacts 1 and 16, the make-and-break devices 22, and the cam members 29 which coöperate with said devices, as clearly set forth in the earlier part of the description above.

The pivotal supporting of the posts 17 and 17' which permits of the same, after unlocking, being rocked downwardly, affords ready access to the devices which are carried at the upper end of the posts for inspection, adjustment or repair of the same.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In an electric safety system for railroads, the combination of brake-setting mechanism on each train; a normally open electric circuit on each train adapted, when closed, to effect operation of the corresponding brake-setting mechanism, one terminal of said circuit being grounded; a contact at the other terminal of said circuit; means for closing said circuit, said means comprising a plurality of normally open make-and-break devices spaced along the track, adapted, when actuated to closed condition, to remain so for a predetermined period; means on each train for actuating said make-and-break devices to closed condition when passed by the former, one side of each of said make-and-break devices being grounded; and a contact connected with the other side of each make-and-break device adapted for engagement by said train contacts, substantially as described.

2. In an electric safety system for railroads, the combination of brake-setting mechanism on each train; a normally open electric circuit on each train adapted, when closed, to effect operation of the corresponding brake-setting mechanism, one terminal of said circuit being grounded; a contact at the other terminal of said circuit; means for closing said circuit, said means comprising a plurality of normally open make-and-break devices spaced along the track adapted, when actuated to closed condition, to remain so for a predetermined period; means on each train for actuating said make-and-break devices to closed condition when passed by the former, one side of each of said make-and-break devices being grounded; and a contact connected with the other side of each make-and-break device adapted for engagement by said train contacts, the contact on each train being positioned in advance of the means thereon for actuating said make-and-break devices, substantially as described.

3. In an electric safety system for railroads, the combination of brake-setting mechanism on each train; a normally open electric circuit on each train adapted, when closed, to effect operation of the corresponding brake-setting mechanism; and a plurality of time-controlled make-and-break devices spaced along the track, each of which being adapted, when actuated to closed condition, to close the mentioned circuit of a train passing the same, substantially as described.

4. In an electric safety system for railroads, the combination of brake-setting mechanism on each train; a normally open electric circuit on each train adapted, when closed, to effect operation of the corresponding brake-setting mechanism; a plurality of make-and-break devices spaced along the track, each of which is adapted, when actuated to closed condition, to remain in this condition for a predetermined period and to close the mentioned circuit of a train passing the same; and means on each train for actuating the make-and-break devices passed thereby to closed condition, substantially as described.

5. In an electric safety system for railroads, the combination of brake-setting mechanism on each train; a normally open electric circuit on each train adapted, when closed, to effect operation of the corresponding brake-setting mechanism; a plurality of make-and-break devices spaced along the track each of which is adapted, when actuated to closed condition, to remain in this condition for a predetermined period; a contact coöperating with each of said make-and-break devices; a contact on each train in the mentioned circuit of the latter adapted for engagement with the contacts of said make-and break devices whereby said train circuit will be closed in the event of the make-and-break devices engaged being in closed condition; and means on each train for automatically actuating the make-and-break devices passed thereby, to closed condition, substantially as described.

6. In an electric safety system for railroads the combination of brake-setting mechanism on each train; a normally open electric circuit on each train adapted, when closed, to effect operation of the corresponding brake-setting mechanism; a plurality of make-and-break devices spaced along the track, each of which is adapted, when actuated to closed condition, to remain in this condition for a predetermined period and to close the mentioned circuit of a train passing the same; means on each train for actuating the make-and-break devices passed thereby to closed condition; and an electrical connection between the contacts of groups of said make-and-break devices adapted to permit all of said contacts of each group being grounded when desired, substantially as described.

7. In an electric safety system for railroads, the combination of brake-setting mechanism on each train; a normally open electric circuit on each train adapted, when closed, to effect operation of the corresponding brake-setting mechanism; a plurality of make-and-break devices spaced along the track, each of which is adapted, when actuated to closed condition, to remain in this condition for a predetermined period and to close the mentioned circuit of a train passing the same; means on each train for actuating the make-and-break devices passed thereby to closed condition, and line wires electrically connecting the contacts of said make-and-break devices in groups or sections, whereby all of the contacts of any group or section may be grounded when desired, substantially as described.

8. In an electric safety system for railroads, the combination of brake-setting mechanism on each train; a normally open electric circuit on each train adapted, when closed, to effect operation of the corresponding brake-setting mechanism; a series of make-and-break devices spaced along the track each of which is adapted, when actuated to closed condition, to remain in this condition for a predetermined period and to close the mentioned circuit of a train passing the same; means on each train for actuating the make-and-break devices passed thereby to closed condition; a second series of make-and-break devices spaced along the track adapted, when actuated to closed condition, to remain in this condition for a predetermined period; an electrical connection between each of the make-and-break devices of the second mentioned series and one or more of the other devices of both of said series whereby, upon closing of any one of said devices of the second series, the mentioned circuit of a train will be closed upon passing anyone of the devices of the first series with which the closed device of the second series is electrically connected; and means on each train for automatically actuating to closed condition the make-and-break devices of said second series passed thereby, substantially as described.

9. In an electric safety system for railroads, the combination of brake-setting mechanism on each train; a normally open electric circuit on each train adapted, when closed to effect operation of the corresponding brake-setting mechanism; a series of make-and-break devices spaced along the track adapted, when actuated to closed condition, to remain in this condition for a predetermined period; an electrical connection between each of said make-and-break devices and one or more of the other make-and-break devices whereby, upon closing of any one of said devices, the mentioned circuit of a train will be closed upon passing of any one of the other devices with which the closed device is electrically connected; and means on each train for automatically actuating to closed condition each of the make-and-break devices passed thereby, substantially as described.

10. In an electric safety system for railroads, the combination of brake-setting mechanism on each train; a normally open electric circuit on each train adapted, when closed, to effect operation of the corresponding brake-setting mechanism, one terminal of each circuit being grounded; a contact at the other terminal of said circuit; means for closing said circuit, said means comprising a series of normally open make-and-break devices spaced along the track adapted, when actuated to closed condition, to remain so for a predetermined period; means on each train for actuating said make-and-break devices to closed condition when passed by the former, one side of each make-and-break device being grounded; a contact connected with the other side of each make-and-break device adapted for engagement by the contact of each train in passing; a second series of normally open make-and-break devices spaced along the track adapted, when actuated to closed condition, to remain so for a predetermined period; means whereby, upon closing of any one of said devices of the second series, an electrical connection will be established between the same and one or more devices of the first series; and means on each train for automatically actuating to closed condition, the make-and-break devices of said second series passed thereby, substantially as described.

11. In an electric safety system for railroads, the combination of brake-setting mechanism on each train; a normally open electric circuit on each train adapted, when closed, to effect operation of the corresponding brake-setting mechanism; a plurality of time-controlled make-and-break devices spaced along the track each of which is adapted, when actuated to closed condition, to close the circuit of a train passing the same; posts for supporting said make-and-break devices; and means on each train for actuating the make-and-break devices passed thereby to closed condition, substantially as described.

12. In an electric safety system for railroads, the combination of brake-setting mechanism on each train; a normally open electric circuit on each train adapted, when closed, to effect operation of the corresponding brake-setting mechanism; a plurality of time-controlled make-and-break devices spaced along the track each of which is adapted, when actuated to closed condition, to close the circuit of a train passing the same; a swingingly mounted post for supporting each of said make-and-break devices; means for releasably locking said posts in vertical position; and means on each train for actuating the make-and-break devices passed thereby to closed condition, substantially as described.

In testimony whereof I have signed my name to this specification in the presence of two subscribing witnesses.

JOHAN SKINDERVIKEN.

Witnesses:
  JOSHUA R. H. POTTS,
  HELEN F. LILLIS.

Copies of this patent may be obtained for five cents each, by addressing the "Commissioner of Patents, Washington, D. C."